United States Patent
Ogura et al.

(10) Patent No.: US 10,581,057 B2
(45) Date of Patent: Mar. 3, 2020

(54) LITHIUM ION BATTERY ELECTROLYTE ELIMINATION METHOD

(71) Applicant: HONDA MOTOR CO., LTD., Tokyo (JP)

(72) Inventors: Shinichi Ogura, Tokyo (JP); Shigetaka Kai, Tokyo (JP); Yasuhide Maki, Tokyo (JP); Tomokazu Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 15/740,844

(22) PCT Filed: Jun. 2, 2016

(86) PCT No.: PCT/JP2016/066492
§ 371 (c)(1),
(2) Date: Dec. 29, 2017

(87) PCT Pub. No.: WO2017/006667
PCT Pub. Date: Jan. 12, 2017

(65) Prior Publication Data
US 2018/0198112 A1  Jul. 12, 2018

(30) Foreign Application Priority Data
Jul. 3, 2015 (JP) ................................ 2015-134256

(51) Int. Cl.
*H01M 10/42* (2006.01)
*H01M 2/36* (2006.01)
(Continued)

(52) U.S. Cl.
CPC ............. *H01M 2/364* (2013.01); *H01M 2/16* (2013.01); *H01M 4/64* (2013.01);
(Continued)

(58) Field of Classification Search
CPC ........................................ H01M 10/42–10/54
See application file for complete search history.

(56) References Cited

U.S. PATENT DOCUMENTS

| | | |
|---|---|---|
| 2001/0008723 A1 | 7/2001 | Kawakami et al. |
| 2010/0068605 A1 | 3/2010 | Harris et al. |
| 2016/0049699 A1 | 2/2016 | Hayashi et al. |

FOREIGN PATENT DOCUMENTS

| | | |
|---|---|---|
| CN | 103825063 A | 5/2014 |
| JP | 2000-235873 A | 8/2000 |

(Continued)

OTHER PUBLICATIONS

European Office Action application No. 16 821 138.1-1108 dated Jan. 15, 2019.

(Continued)

*Primary Examiner* — Cynthia K Walls
(74) *Attorney, Agent, or Firm* — Squire Patton Boggs (US) LLP

(57) ABSTRACT

The present invention comprises steps of forming an opening portion in a battery case; aspirating an electrolyte solution from the interior of the battery case through the opening portion and into a sealed and depressurized electrolyte solution recovery trap; injecting a solvent containing no electrolyte from a solvent tank through the opening portion, and into the battery case; and aspirating a mixed solution from the interior of the battery case through the opening portion and into the sealed and depressurized electrolyte solution recovery trap. By performing the above-mentioned process, battery constitutive members including the battery case can be disassembled and recovered efficiently in large quantities.

4 Claims, 7 Drawing Sheets

(51) Int. Cl.
  *H01M 10/54* (2006.01)
  *H01M 2/16* (2006.01)
  *H01M 4/64* (2006.01)
  *H01M 10/0525* (2010.01)
  *H01M 4/02* (2006.01)

(52) U.S. Cl.
  CPC ....... *H01M 10/0525* (2013.01); *H01M 10/54* (2013.01); *H01M 2004/027* (2013.01); *H01M 2004/028* (2013.01); *Y02T 10/7011* (2013.01); *Y02W 30/84* (2015.05)

(56) References Cited

FOREIGN PATENT DOCUMENTS

| | | |
|---|---|---|
| JP | 2013-109841 A | 6/2013 |
| JP | 2013-229326 A | 11/2013 |
| JP | 2014-049253 A | 3/2014 |
| JP | 2014-123460 A | 7/2014 |
| JP | 2015-028928 A | 2/2015 |
| WO | 2014155784 A1 | 10/2014 |

OTHER PUBLICATIONS

International Search Report & Written Opinion dated Aug. 2, 2016 corresponding to International Patent Application No. PCT/JP2016/066492, and English translation thereof.
European Office Action application No. 16 821 138.1-1108 dated Jan. 16, 2019.
Apr. 16, 2018 Extended Search Report issued in European Patent Application No. 16821138.1.

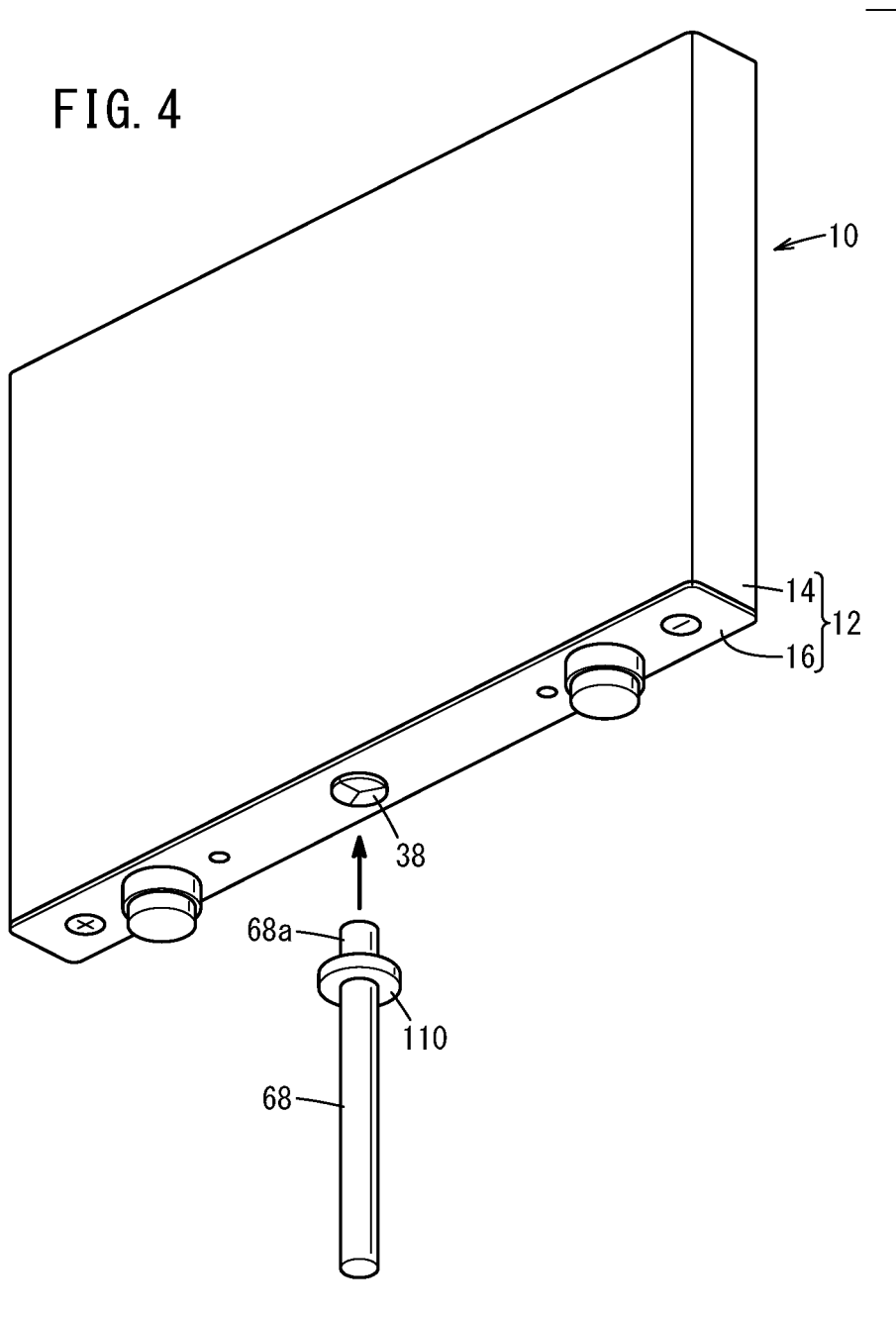

LITHIUM ION BATTERY ELECTROLYTE ELIMINATION METHOD

TECHNICAL FIELD

The present invention relates to a lithium ion battery electrolyte removal (elimination) method for removing an electrolyte that remains inside a battery casing.

BACKGROUND ART

Large sized lithium ion batteries have been used to supply high capacity electricity to electric vehicles and electronic devices that have become popular in recent years. Accompanying widespread use of lithium ion batteries, countermeasures for the treatment of used batteries are becoming important.

When processing lithium ion batteries, treatment of the electrolytic solution becomes a problem. For example, if an electrolyte (fluorine compound) contained in the electrolytic solution comes into contact with moisture in the air, harmful corrosive gases are generated. Conventionally, in order to ensure safety during operation, generally, lithium ion batteries have been incinerated, utilizing the fact that an organic solvent is used as the electrolytic solution. However, since corrosive gases generated during the incineration treatment cause damage to the equipment, measures to protect the equipment are required. Further, if the incineration treatment is carried out, it becomes difficult to reuse the battery constituent members of the lithium ion batteries.

As another treatment for a lithium ion battery, a method has been proposed in which a lithium ion battery is frozen below the melting point of the electrolytic solution, and then the battery is disassembled and crushed while frozen. With this method, generation of corrosive gases can be suppressed. However, such a method requires large-scale freezing equipment, so there are problems in terms of cost and installation space.

Japanese Laid-Open Patent Publication No. 2013-229326 discloses a method for safely recovering an electrolytic solution. More specifically, at first, volatile components of the electrolytic solution containing a fluorine compound are heated and vaporized in a reduced pressure environment. Next, the harmful fluorine components contained within the vaporized gas are reacted with calcium and solidified in the form of calcium fluoride, together with recovering an organic solvent component contained within the vaporized gas. The recovered organic solvent component, in the form of an organic solvent from which fluorine has been removed, is used as a fuel or the like.

Japanese Laid-Open Patent Publication No. 2013-109841 discloses a method for reducing the pressure of a lithium ion battery to a specified pressure range, together with raising the temperature thereof to a specified temperature range, and then opening a pressure relief valve to remove an organic solvent from the lithium ion battery.

SUMMARY OF INVENTION

According to the method of Japanese Laid-Open Patent Publication No. 2013-229326, recovery of an electrolytic solution is made possible. On the other hand, time is required for the fluorine components to react with calcium and become solidified in the form of calcium fluoride. Therefore, from the standpoint of disassembly and recovery in a large quantity of the battery constituent members including the battery casings, the operation cannot be considered efficient.

Further, as described in Japanese Laid-Open Patent Publication No. 2013-109841, in the case that the organic solvent is vaporized under a reduced pressure environment, problems occur in that it is very difficult to set the temperature and the degree to which the pressure is reduced, and to sufficiently remove the organic solvent.

The present invention has been devised taking into consideration the aforementioned problems, and has the object of providing a lithium ion battery electrolyte removal method, which enables disassembly and efficient recovery in large quantity of battery constituent members including the battery casing.

The present invention is characterized by a lithium ion battery electrolyte removal method for removing an electrolyte from the interior of a battery casing filled with an electrolytic solution, comprising an opening forming step of forming an opening in the battery casing, an electrolytic solution aspirating step of sucking out the electrolytic solution from the interior of the battery casing, via the opening, and into a sealed and depressurized electrolytic solution recovery trap, a solvent injecting step of injecting a solvent that does not contain an electrolyte from a solvent tank, via the opening, and into the interior of the battery casing, and a mixed solution aspirating step of sucking out a mixed solution, which contains the solvent injected into the battery casing in the solvent injecting step as well as any of the electrolyte remaining inside the battery casing, from the interior of the battery casing, via the opening, and into the sealed and depressurized electrolytic solution recovery trap.

According to the present invention, the opening is formed in the battery casing of the lithium ion battery, and the electrolytic solution is sucked out from the battery casing, via the opening, and into the sealed and depressurized electrolytic solution recovery trap. At this stage, a portion of the electrolyte that cannot be sucked out remains inside the battery casing. Thus, after having recovered the electrolytic solution, the solvent is injected into the battery casing from the solvent tank to thereby clean the interior of the battery casing. Inside the battery casing, a mixed solution is produced, which is made up of the injected solvent and the remaining electrolyte, and the mixed solution containing the electrolyte is sucked out via the opening into the sealed and depressurized electrolytic solution recovery trap. According to the present invention, using a simple method by which, after the electrolyte solution inside the battery casing has been sucked out into the sealed and depressurized electrolytic solution recovery trap, the interior of the battery casing is cleaned by carrying out both injection and sucking out of the solvent, in addition to removal of the electrolyte from the battery constituent members including the battery casing, it is possible to safely disassemble the lithium ion battery. Accordingly, without waste, it is possible to take out and recover the battery constituent members including the battery casing. Furthermore, the electrolyte can be easily recovered.

In the present invention, in the opening forming step, a pressure relief valve, which is provided on the battery casing, may be arranged to face vertically downward, and the opening may be formed in the pressure relief valve. Since the pressure relief valve is thin-walled, it is easy to form the opening. Further, by orienting the pressure relief valve to face vertically downward, it is possible to efficiently aspirate the electrolytic solution as well as the mixed solution.

In the present invention, a first opening and closing valve may be provided, which is adapted to switch between a communicating state and a communication interrupted state between the opening and the electrolytic solution recovery trap, and a second opening and closing valve may be provided, which is adapted to switch between a communicating state and a communication interrupted state between the opening and the solvent tank. In the electrolytic solution aspirating step, the first opening and closing valve may be opened and the second opening and closing valve may be closed, to thereby place the opening and the sealed and depressurized electrolytic solution recovery trap in a communicating state. In the solvent injecting step, the first opening and closing valve may be closed, and thereafter, the second opening and closing valve may be opened, to thereby place the opening and the solvent tank in a communicating state. In the mixed solution aspirating step, the first opening and closing valve may be opened and the second opening and closing valve may be closed, to thereby place the opening and the sealed and depressurized electrolytic solution recovery trap in a communicating state.

After the electrolytic solution has been sucked out from the battery casing in the electrolytic solution aspirating step, the interior of the battery casing is placed in a reduced pressure state where the degree of vacuum is high. The interior of the battery casing, which is in the reduced pressure state, and the solvent tank, which is in a higher pressure state than the battery casing, are placed in communication with each other by the second opening and closing valve, and therefore, it is possible to easily inject the solvent from the solvent tank into the battery casing. In addition, in the solvent injecting step, cleaning can be performed by causing the solvent to flow back into the cell portion in the battery casing, and a significant cleaning effect can be obtained. Further, after the solvent has been injected into the battery casing in the solvent injecting step, the battery casing and the sealed and depressurized electrolytic solution recovery trap are placed in communication with each other again via the first opening and closing valve. Therefore, the electrolyte that was recovered in the electrolytic solution aspirating step, and the mixed solution that was recovered in the mixed solution aspirating step can be recovered by the same route via the first opening and closing valve. Therefore, the configuration of the apparatus can be simplified.

In the present invention, the first opening and closing valve and the second opening and closing valve may be constituted by a switching valve adapted to switch, in a timewise differentiated manner, the communicating state between the opening and the electrolytic solution recovery trap, and the communicating state between the opening and the solvent tank. By using the switching valve, switching from the communicating state between the opening and the electrolytic solution recovery trap to the communicating state between the opening and the solvent tank, and switching from the communicating state between the opening and the solvent tank to the communicating state between the opening and the electrolytic solution recovery trap can be carried out with a simple operation.

In the present invention, following the mixed solution aspirating step, a plurality of sets of the solvent injecting step and the mixed solution aspirating step may be repeated. By performing the solvent injecting step and the mixed solution aspirating step a plurality of times, a highly significant cleaning effect inside the battery casing can be obtained. Accordingly, it becomes possible to more safely disassemble the lithium ion battery.

In the present invention, in the electrolytic solution aspirating step and the mixed solution aspirating step, the battery casing may be heated. A large aspirating effect can be obtained by raising the temperature inside the battery casing. Accordingly, it is possible for the electrolytic solution and the mixed solution to be sucked out efficiently.

According to the present invention, by cleaning the interior of the battery casing with a solvent, it is possible to remove the electrolyte from the battery constituent members including the battery casing. Accordingly, it becomes possible to safely disassemble the lithium ion battery. In addition, without waste, it is possible to take out and recover the battery constituent members including the battery casing. Furthermore, the electrolyte can be easily recovered.

BRIEF DESCRIPTION OF DRAWINGS

FIG. 4 is a perspective view of the lithium ion battery and a pipe;

DESCRIPTION OF EMBODIMENTS

A preferred embodiment of a lithium ion battery electrolyte removal method according to the present invention will be described in detail below with reference to the accompanying drawings.

1. Lithium Ion Battery 10

Figure 1:
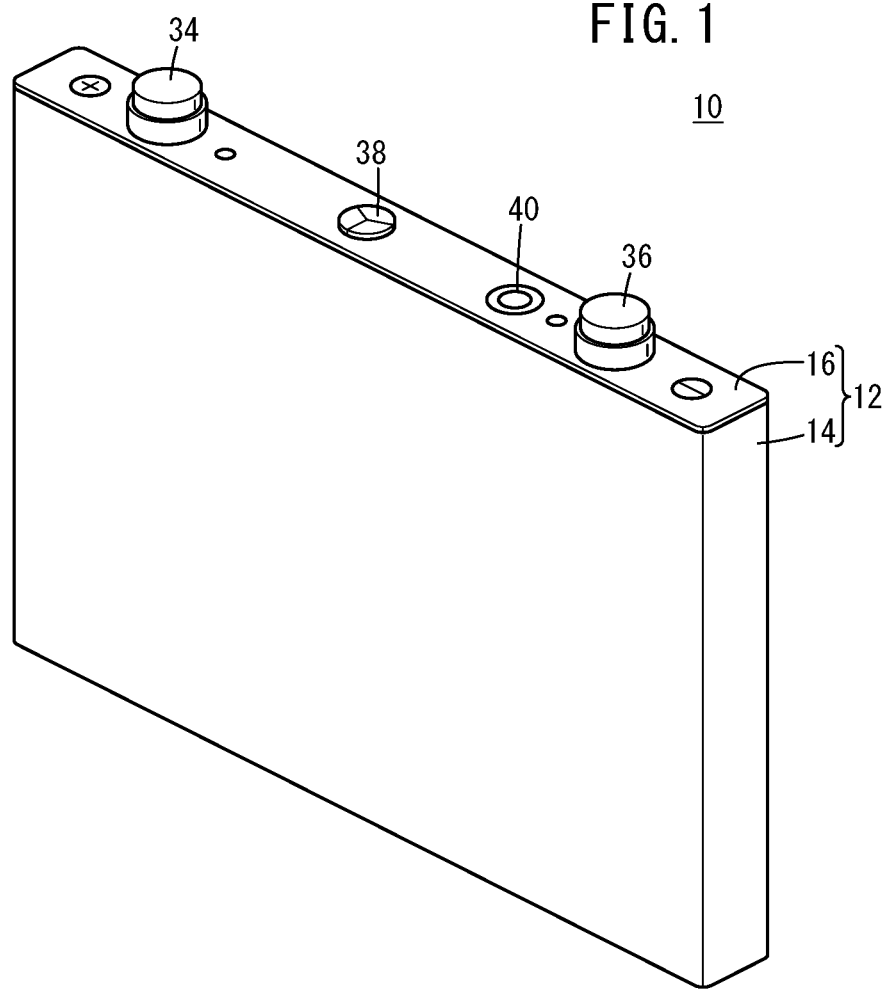
FIG. 1 is an external perspective view of a lithium ion battery.
Figure 2:
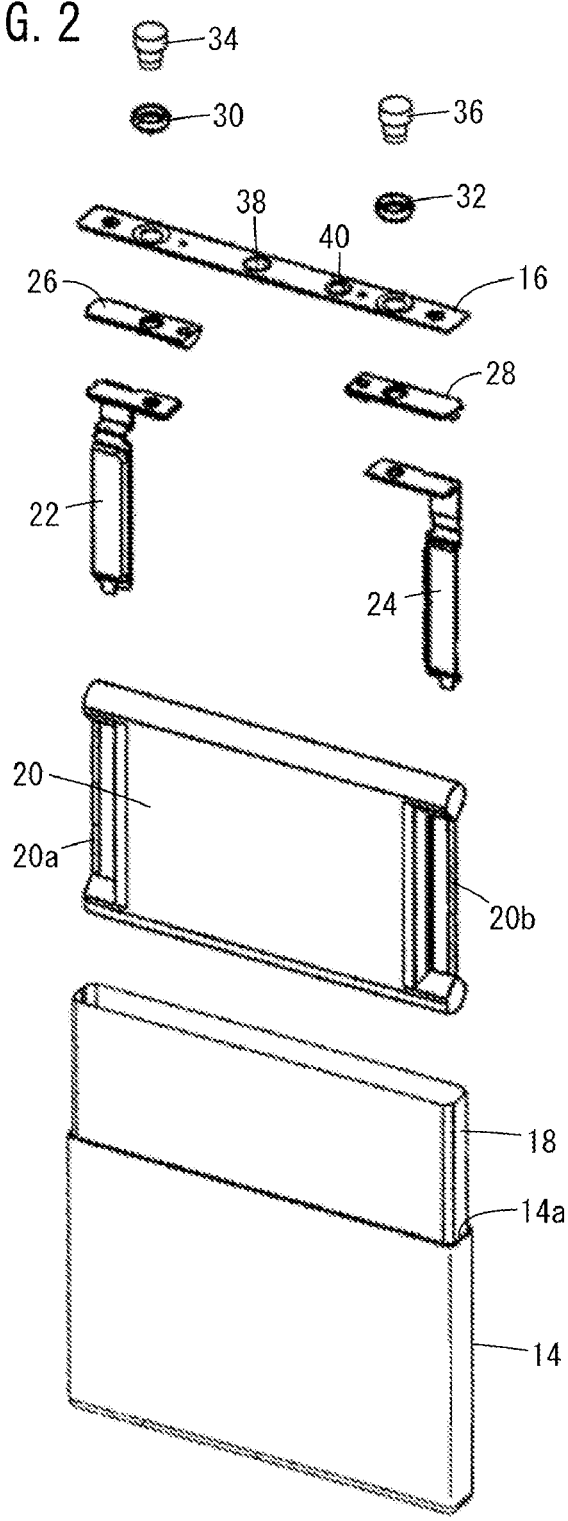
FIG. 2 is an exploded perspective view of the lithium ion battery.

The configuration of a lithium ion battery 10 will be described with reference to FIGS. 1 and 2. The lithium ion battery 10 shown in FIGS. 1 and 2 is a cell. In general, a plurality of such lithium ion batteries 10 are connected together to constitute a battery. The structure of the lithium ion battery 10 is well known and is disclosed, for example, in Japanese Laid-Open Patent Publication No. 2014-049253.

As shown in FIG. 1, a battery casing 12 of the lithium ion battery 10 is made up from a container 14 and a lid 16. The container 14 comprises four side surfaces and a bottom surface connected to one end on each of the side surfaces. An opening 14a (see FIG. 2) is formed by the other end of each of the side surfaces. The plate-shaped lid 16 is joined to the opening 14a. Although the shape of the battery casing 12 shown in FIG. 1 is a substantially six-sided parallelepiped, the shape thereof is not limited. For example, the battery casing 12 may have a cylindrical shape or another shape.

As shown in FIG. 2, an insulating case 18, a power generator 20, a positive electrode current collector 22, a negative electrode current collector 24, and insulating members 26, 28 are housed in the container 14 and sealed with the lid 16. The insulating case 18 has a tubular shape along the inner peripheral surface of the container 14. The power generator 20 is accommodated inside the insulating case 18. The power generator 20 is made up from a stacked body in which there are stacked, respectively, elongated positive electrode material, first separator, negative electrode material, second separator, and a support member for the stacked body. The stacked body is constituted by being wound about a central axis in a widthwise direction of the lithium ion battery 10. The positive electrode plate and the negative electrode plate are stacked while being shifted mutually from each other. Therefore, a positive electrode 20a made up from the positive electrode plate is formed at one end (on the left side in the drawing) of the power generator 20, and a negative electrode 20b made up from the negative electrode plate is formed on the other end (on the right side in the drawing) of the power generator 20. The positive electrode current collector 22 is connected electrically to the positive electrode 20a. The positive electrode current collector 22 is fixed to a rear surface of the lid 16 via a plate-shaped insulating member 26. The negative electrode current collector 24 is connected electrically to the negative electrode 20b. The negative electrode current collector 24 is fixed to a rear surface of the lid 16 via a plate-shaped insulating member 28.

As shown in FIG. 1 and FIG. 2, a positive electrode terminal 34 and a negative electrode terminal 36 are attached to a surface of the lid 16 via gaskets 30 and 32. The positive electrode terminal 34 is electrically connected inside the battery casing 12 to the positive electrode current collector 22, and the negative electrode terminal 36 is electrically connected inside the battery casing 12 to the negative electrode current collector 24. Furthermore, a pressure relief valve 38 and an injection port 40 are formed in the lid 16. The pressure relief valve 38 is more thin-walled in comparison with other portions of the lid 16, and a groove is formed on the surface thereof so as to facilitate cleavage (opening) thereof. The pressure relief valve 38 undergoes cleavage as the internal pressure rises to a predetermined pressure or higher due to generation of gas inside the battery casing 12 caused by a rise in temperature or the like. By the pressure relief valve 38 undergoing cleavage, the rise in the internal pressure is suppressed. The injection port 40 is closed or capped after the electrolytic solution has been injected into the interior of the battery casing 12.

The materials of the respective battery constituent members of the lithium ion battery 10 will now be exemplified. The container 14 and the lid 16 are made of a metal, for example, aluminum or an aluminum alloy. The insulating case 18 is formed by an insulating resin such as polypropylene or the like. The positive electrode material, the positive electrode current collector 22, and the positive electrode terminal 34 of the power generator 20 are formed by an aluminum alloy. The negative electrode material, the negative electrode current collector 24, and the negative electrode terminal 36 of the power generator 20 are formed by an aluminum alloy. The first and second separators of the power generator 20 are formed by a polyethylene resin. The insulating members 26, 28 and the gaskets 30, 32 are formed by an insulating resin such as polybutylene terephthalate, polyphenylene sulfide, perfluoroalkoxy fluorine resins, or the like. According to the present embodiment, each of such members can be used as recyclable or regenerative materials after the electrolyte remaining on the surfaces thereof has been removed.

The interior of the battery casing 12 is filled with an electrolytic solution. As the electrolyte of the electrolytic solution, $LiPF_6$, $LiBF_4$, $LiN(SO_2Rf)_2$, $LiC(SO_2Rf)_3$ (where $Rf=CF_3$, $C_2F_5$) and the like may be used alone or in combination. As a solvent of the electrolytic solution, organic solvents such as ethylene carbonate, propylene carbonate, dimethyl carbonate, ethyl methyl carbonate and the like may be used alone or in combination. According to the present embodiment, after being separated, the solvent and the electrolyte are capable of being reused, respectively.

2. Lithium Ion Battery Treatment System 50

The configuration of a lithium ion battery treatment system 50 used in the present embodiment will be described with reference to FIG. 3. The lithium ion battery treatment system 50 is constituted by combining an electrolyte removal system 52 and a solvent separation and recovery system 54. The electrolyte removal system 52 is a system for aspirating the electrolytic solution from inside the battery casing 12 of the lithium ion battery 10, together with removing any electrolyte remaining inside the battery casing 12. The solvent separation and recovery system 54 is a system for recovering the solvent by separating the electrolytic solution that was sucked out from the battery casing 12 into the solvent and the electrolyte. It should be noted that the electrolyte removal system 52 and the solvent separation and recovery system 54 may also be provided separately and independently from each other.

The electrolyte removal system 52 comprises the lithium ion battery 10, a gas supply pump 60, a solvent tank 62, an electrolytic solution recovery trap 64, a vacuum pump 66, respective pipes (first pipe 68, second pipe 70, third pipe 72, fourth pipe 74, fifth pipe 76), and respective valves (first valve 78, second valve 80, fourth valve 96). On the other hand, the solvent separation and recovery system 54 comprises the electrolytic solution recovery trap 64, a solvent recovery trap 84, the vacuum pump 66, respective pipes (sixth pipe 86, seventh pipe 88, eighth pipe 90, ninth pipe 92), and respective valves (third valve 94, fourth valve 96). In the lithium ion battery treatment system 50, the electrolyte removal system 52 and the solvent separation and recovery system 54 use the fourth valve 96 and the vacuum pump 66 in common.

The respective parts of the electrolyte removal system 52 are connected in the following manner. The lithium ion battery 10 and one of the ports of the first valve 78 communicate with each other via the first pipe 68. The other port of the first valve 78 communicates with the electrolytic solution recovery trap 64 via the second pipe 70. The gas supply pump 60 and the solvent tank 62 communicate with each other via the third pipe 72. The solvent tank 62 and one of the ports of the second valve 80 communicate with each other via the fourth pipe 74. The other port of the second valve 80 communicates with the first pipe 68 via the fifth pipe 76. The fifth pipe 76 corresponds to a branch conduit of the first pipe 68.

The respective parts of the solvent separation and recovery system 54 are connected in the following manner. The electrolytic solution recovery trap 64 and one port of the third valve 94 communicate with each other via the sixth pipe 86. The other port of the third valve 94 communicates with the solvent recovery trap 84 via the seventh pipe 88. The solvent recovery trap 84 and one port of the fourth valve 96 communicate with each other via the eighth pipe 90. The other port of the fourth valve 96 communicates with the vacuum pump 66 via the ninth pipe 92.

The gas supply pump 60 supplies an inert gas such as nitrogen or the like to the downstream side solvent tank 62. The solvent tank 62 stores therein a solvent of the aforementioned electrolytic solution, and more specifically, an organic solvent such as ethylene carbonate, propylene carbonate, dimethyl carbonate, ethyl methyl carbonate, or the like. The organic solvent stored in the solvent tank 62 is preferably the same as the solvent constituting the electrolyte that is filled in the lithium ion battery 10. The lithium ion battery 10 is the battery that was described with reference to FIGS. 1 and 2. The lithium ion battery 10 is installed in a manner so that the pressure relief valve 38 of the battery casing 12 faces vertically downward. A first temperature controller 100 is disposed in the lithium ion battery 10. The first temperature controller 100 includes both heating and cooling functions, and is capable of raising as well as lowering the temperature inside the battery casing 12. The electrolytic solution recovery trap 64 temporarily stores the electrolytic solution sucked out from the battery casing 12 and a mixed liquid to be described later. A second temperature controller 102 is disposed in the electrolytic solution recovery trap 64. The second temperature controller 102 includes both heating and cooling functions, and is capable of raising as well as lowering the temperature inside the electrolytic solution recovery trap 64.

The solvent recovery trap 84 condenses and stores the solvent that was distilled and separated in the electrolytic solution recovery trap 64. A third temperature controller 104 is disposed in the solvent recovery trap 84. The third temperature controller 104 includes a cooling function, and is capable of lowering the temperature inside the solvent recovery trap 84. The vacuum pump 66 discharges the gas from the solvent recovery trap 84 and the electrolytic solution recovery trap 64, thereby reducing the pressure inside the vacuum pump 66 to a high degree of vacuum. Accordingly, when the first valve is opened, liquid and gas are sucked out from the interior of the battery casing 12 of the lithium ion battery 10, and the interior thereof is reduced in pressure, i.e., depressurized.

The first valve 78, the second valve 80, the third valve 94, and the fourth valve 96 switch between a communicating state and a communication interrupted state of the pipes that are disposed in one port and another port, respectively. The first valve 78, the second valve 80, the third valve 94, and the fourth valve 96 may be opened and closed by supplying an electric signal or a hydraulic pressure signal thereto, or the valves may also be opened and closed manually.

3. Method of Connecting the Lithium Ion Battery 10 to System

Figure 5A:
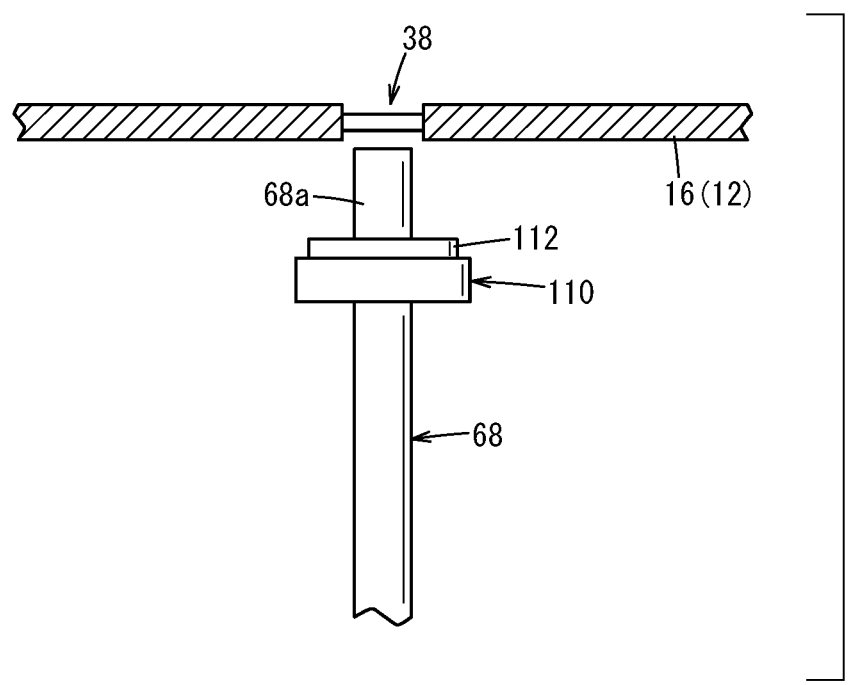
FIG. 5A is a schematic view of a lid and a pipe prior to connection thereof.
Figure 5B:
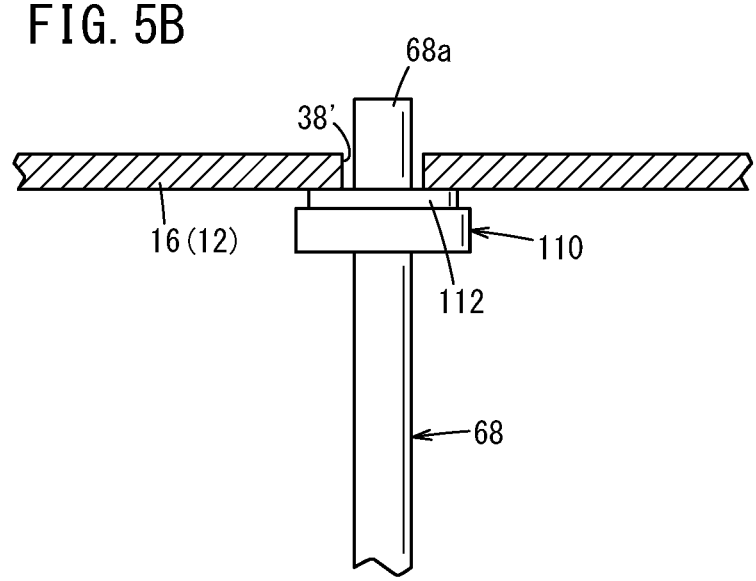
FIG. 5B is a schematic diagram of the lid and the pipe after connection thereof.

A method of connecting the lithium ion battery 10 to the lithium ion battery treatment system 50 will be described with reference to FIGS. 4, 5A, and 5B. A seal flange 110 which is expanded in a radial direction is formed at one end of the first pipe 68. As shown in FIGS. 5A and 5B, a seal member 112 made of rubber is provided on an end surface of the seal flange 110. In addition, a distal end part 68a of the first pipe 68 is formed so as to project outwardly from the seal flange 110 and the seal member 112.

The lithium ion battery 10 is arranged with the pressure relief valve 38 oriented vertically downward. Then, the distal end part 68a of the first pipe 68 is pressed from vertically below against the pressure relief valve 38. As described above, since the pressure relief valve 38 is thin-walled, when the distal end part 68a of the first pipe 68 is forcibly pressed, the pressure relief valve 38 undergoes cleavage and the opening 38' is formed therein (see FIG. 5B). After the pressure relief valve 38 has been cleaved and opened, the distal end part 68a of the first pipe 68 is pressed into the battery casing 12. When the distal end part 68a is pressed therein to a certain extent, the seal member 112 is pressed by the seal flange 110 against the surface of the lid 16. In this state, the battery casing 12 and the first pipe 68 are fixed to each other using a non-illustrated fixing tool. In this manner, the battery casing 12 and the first pipe 68 are placed in communication, together with the interior of the battery casing 12 being sealed by the seal member 112.

4. Descriptions of Respective Processes

Next, with reference to FIG. 6, a description will be given of the procedure of the electrolyte removal process in which the lithium ion battery treatment system is used, and with reference to FIG. 7, a description will be given of the procedure of the solvent separation and recovery process in which the lithium ion battery treatment system 50 is used.

4-1. Electrolyte Removal Process

The electrolyte removal process includes an electrolytic solution aspirating process by which the electrolytic solution (including a mixed solution, to be described later) is aspirated from the battery casing 12, and a cleaning process for cleaning the interior of the battery casing 12 to eliminate the electrolyte. Moreover, in the case that the electrolyte removal process is carried out using the lithium ion battery treatment system 50 shown in FIG. 3, it is necessary to open the third valve 94 of the solvent separation and recovery system 54 in order to secure an extraction flow passage between the electrolytic solution recovery trap 64 and the vacuum pump 66. For this purpose, opening and closing of the third valve 94 is controlled by a later-described process. Further, the temperature of the solvent recovery trap 84 is also controlled by the third temperature controller 104.

4-1-1. Electrolyte Discharging Process

Before operating the lithium ion battery treatment system 50, the empty electrolytic solution recovery trap 64 and the empty solvent recovery trap 84 are installed at predetermined positions in the system. At this point in time, the first valve 78, the second valve 80, the third valve 94, and the fourth valve 96 are closed.

Figure 6:
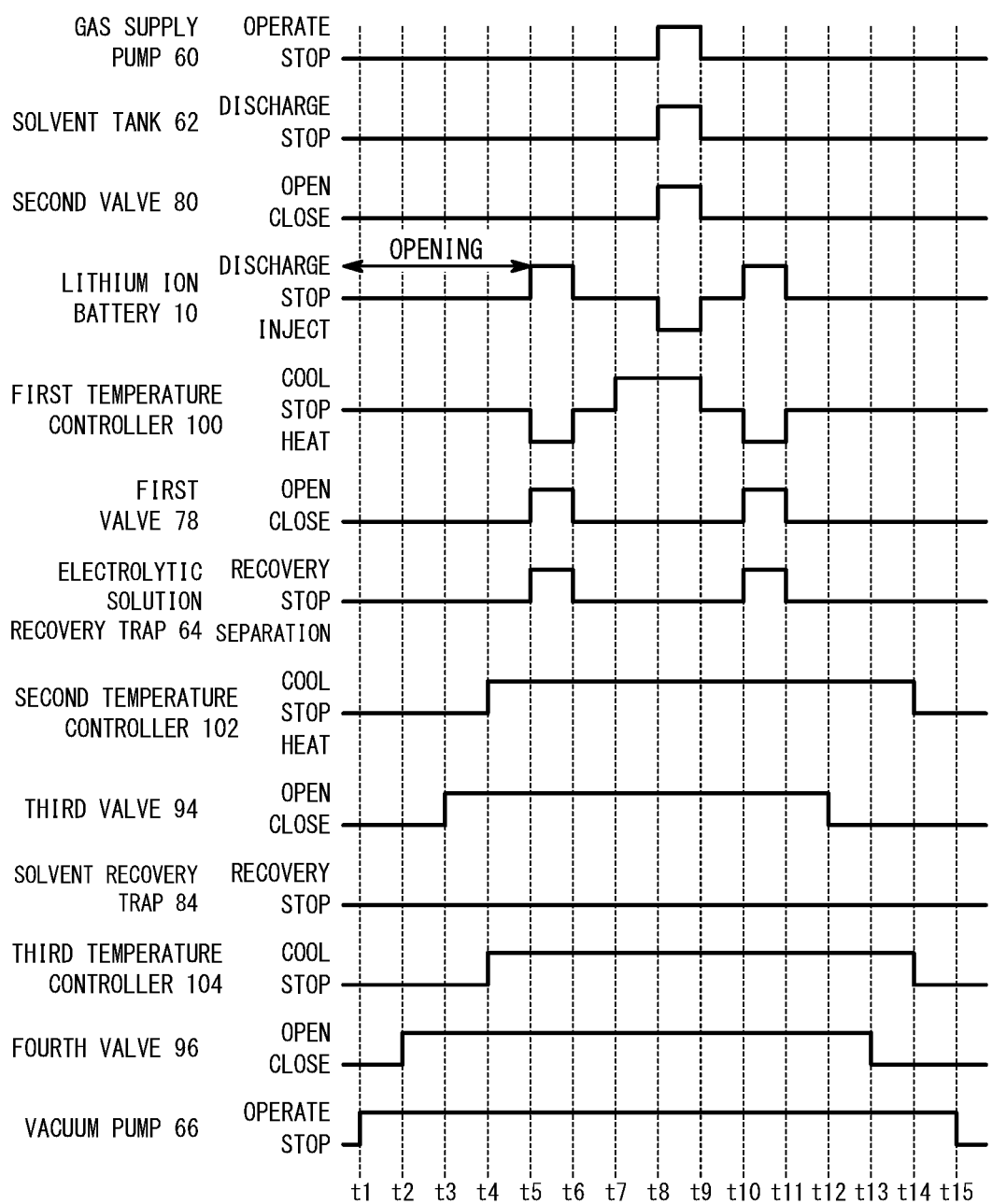
FIG. 6 is a time chart of an electrolyte removal process.

As shown in FIG. 6, the vacuum pump 66 is operated at time t1. Next, at time t2, the fourth valve 96 is opened, and at time t3, the third valve 94 is opened. At this time, the interior of the electrolytic solution recovery trap 64 communicates with the vacuum pump 66 through the sixth pipe 86, the third valve 94, the seventh pipe 88, the solvent recovery trap 84, the eighth pipe 90, the fourth valve 96, and the ninth pipe 92. Therefore, the gas in the interior of the electrolytic solution recovery trap 64 is evacuated by the vacuum pump 66, reducing the pressure therein to a value, for example, on the order of 1 to $10^{-1}$ Pa. Furthermore, at time t4, the cooling functions of the second temperature controller 102 and the third temperature controller 104 are activated to adjust the temperature inside the respective traps to be equal to or less than the boiling point of the solvent to be recovered. In accordance with the above process, the interior of the electrolytic solution recovery trap 64 is placed in a low temperature and a low pressure state.

At the next time point, i.e., up until time t5, a used lithium ion battery 10 is installed in the lithium ion battery treatment system 50. At that time, as shown in FIGS. 4, 5A, and 5B, the lithium ion battery 10 is placed in state with the pressure relief valve 38 of the battery casing 12 oriented vertically downward, and the pressure relief valve 38 is cleaved by the distal end part 68a of the first pipe 68 to thereby form the opening 38', together with the opening 38' being sealed by the seal member 112. In this manner, the first pipe 68 and the interior of the battery casing 12 are place in communication in advance. This operation is preferably performed immediately before time t5. For example, the operation preferably is carried out after time t4.

While the low temperature and low pressure state of the electrolytic solution recovery trap 64 is maintained at time t5, the first valve 78 is opened. The interior of the battery casing 12 is placed in communication with the interior of the electrolytic solution recovery trap 64 via the first pipe 68, the first valve 78, and the second pipe 70. Further, the interior of the battery casing 12 is also placed in communication with the vacuum pump 66 via the electrolytic solution recovery trap 64, the sixth pipe 86, the third valve 94, the seventh pipe 88, the solvent recovery trap 84, the eighth pipe 90, the fourth valve 96, and the ninth pipe 92. Furthermore, substantially simultaneously with opening of the first valve 78, the heating function of the first temperature controller 100 is activated. Due to such heating, vaporization of any residual electrolyte solution remaining inside the battery casing 12 is promoted, in addition to the degree of vacuum by which the electrolytic solution in the battery casing 12 sucked out by the vacuum pump 66, and therefore, a large aspirating effect can be obtained. Moreover, from the standpoint of reusing the battery constituent members, it is preferable for first temperature controller 100 to provide an adjusted temperature range in which the first and second separators, which are included in the power generator 20 of the lithium ion battery 10 (see FIG. 2), do not become fusion bonded with the positive electrode material and the negative electrode material. Through the aforementioned process, the electrolytic solution is sucked out from the battery casing 12 into the electrolytic solution recovery trap 64. In the present embodiment, in accordance with such a principle, the electrolytic solution is sucked out from the battery casing 12 via the opening 38', and is recovered in the electrolytic solution recovery trap 64. Furthermore, the lithium ion battery 10 is arranged in a manner so that the opening 38' (pressure release valve 38) thereof faces vertically downward. Therefore, under its own weight, the electrolytic solution moves easily to the side of opening, is efficiently aspirated from the battery casing 12, and is efficiently recovered by the electrolytic solution recovery trap 64.

At time t6, when the degree of vacuum inside the battery casing 12 increases, aspiration and recovery of the electrolytic solution are stopped. When aspiration of the electrolytic solution is stopped, the first valve 78 is closed. Furthermore, substantially simultaneously with closing of the first valve 78, the heating function of the first temperature controller 100 is also stopped.

By carrying out the processes from time t1 to time t6, it is possible to recover the electrolytic solution that was filled in the battery casing 12 into the interior of the electrolytic solution recovery trap 64. However, a small amount of the electrolytic solution may remain inside the battery casing 12, and thus there is a possibility that the electrolyte may remain on surfaces of the respective battery constituent members that are accommodated in the battery casing 12. Thus, according the present embodiment, a cleaning process of cleaning the interior of the battery casing 12 with a solvent is performed. This process will next be described below.

4-1-2. Cleaning Process

At time t7, the cooling function of the first temperature controller 100 is activated to thereby adjust the internal temperature of the battery casing 12 to a low temperature which is less than or equal to the boiling point and is greater than or equal to the freezing point of the solvent. At this time, the interior of the battery casing 12 is depressurized to a high degree of vacuum by sucking out the electrolytic solution. Therefore, the interior of the battery casing 12 is placed in a low temperature as well as a low pressure state.

At time t8, the gas supply pump 60 is operated. Upon doing so, an inert gas is supplied into the interior of the solvent tank 62, and the interior of the solvent tank 62 is placed in a high pressure state. When the second valve 80 is opened at substantially simultaneously with starting of the gas supply pump 60, the interior of the battery casing 12 is placed in communication with the interior of the solvent tank 62 via the first pipe 68, the fifth pipe 76, the second valve 80, and the fourth pipe 74. At this time, the interior of the battery casing 12 is in a low temperature and low pressure state, and in this state, the solvent is discharged from the solvent tank 62 and is injected into the battery casing 12 through the opening 38'.

At time t9, the gas supply pump 60 is stopped and the second valve 80 is closed. Upon doing so, injection of the solvent from the solvent tank 62 into the battery casing 12 is stopped. Closing of the second valve 80 may be carried out when a predetermined period of time (the time period during which the solvent is filled in the battery casing 12) has elapsed from time t8. Further, closing thereof may be carried out when the amount of solvent injected from the solvent tank 62 into the battery casing 12 has reached an appropriate amount. The amount of the solvent to be injected is obtained from the electrolytic solution filling capacity of the interior the battery casing 12. In the interior of the battery casing 12, the injected solvent and the remaining electrolytic solution are mixed, together with any electrolyte adhering to the surfaces of the respective battery constituent members being dissolved in the solvent, to thereby produce a mixed solution.

From time t10 to time t11, the same processes as those carried out from time t5 to time t6 are performed for each operation target. More specifically, while the low temperature and low pressure state of the electrolytic solution recovery trap 64 is maintained at time t10, the first valve 78 is opened. The interior of the battery casing 12 is placed in communication with the interior of the electrolytic solution recovery trap 64 via the first pipe 68, the first valve 78, and the second pipe 70. Further, the interior of the battery casing 12 is also placed in communication with the vacuum pump 66 via the electrolytic solution recovery trap 64, the sixth pipe 86, the third valve 94, the seventh pipe 88, the solvent recovery trap 84, the eighth pipe 90, the fourth valve 96, and the ninth pipe 92. Furthermore, substantially simultaneously with opening of the first valve 78, the heating function of the first temperature controller 100 is activated. By means of the aforementioned process, the mixed solution is sucked out from the battery casing 12 into the electrolytic solution recovery trap 64.

At time t11, when the degree of vacuum inside the battery casing 12 increases, aspiration and recovery of the mixed solution are stopped. When aspiration of the mixed solution is stopped, the first valve 78 is closed. Furthermore, substantially simultaneously with closing of the first valve 78, the heating function of the first temperature controller 100 is also stopped.

By carrying out the processes, i.e., the solvent injecting step and the mixed solution aspirating step, from time t7 to time t11, any electrolytic solution remaining inside the battery casing 12 can be recovered. Further, the surfaces of the respective battery constituent members that are housed inside the battery casing 12 are cleaned by the solvent, and any of the electrolytes remaining on respective surfaces thereof can be recovered by dissolution into the solvent. If one set of the solvent injecting step and the mixed solution aspirating step is carried out, the amount of electrolyte remaining inside the battery casing 12 can be reduced to such an extent that no harm is caused when the battery casing 12 is disassembled. Furthermore, if a plurality of the aforementioned sets are repeated as required, it is possible to have hardly any of the electrolyte remaining inside the battery casing 12.

Upon completion of the electrolyte removal process, the lithium ion battery treatment system 50 is stopped. Then, at time t12, the third valve 94 is closed, and at time t13, the fourth valve 96 is closed. Next, at time t14, the second temperature controller 102 and the third temperature controller 104 are stopped. Finally, at time t15, the vacuum pump 66 is stopped.

In the case that the electrolyte removal process is performed continuously on a plurality of lithium ion batteries 10, then after time t11 when the mixed solution aspirating step is completed, the lithium ion battery 10 is removed from the first pipe 68, and another lithium ion battery 10 is attached to the first pipe 68. In addition, the electrolytic solution aspirating step is performed again from time t5.

In accordance with the above process, it is possible to aspirate the electrolytic solution inside the battery casing 12 to a state where almost none of the electrolytic solution remains, and it is possible to safely disassemble the lithium ion battery 10, which is in an empty state in which the electrolytic solution has been extracted therefrom. Following disassembly, for example, the battery casing 12 is reused. Further, the battery constituent members that are housed in the battery casing 12 are subjected to the dissolution process, and after such dissolution, the metal can be reused as a material for other components.

4-2. Solvent Separation and Recovery Process

The solvent separation and recovery process is a process for recovering the solvent from the electrolytic solution and the mixed solution, which has been recovered in the electrolytic solution recovery trap 64.

Figure 7:
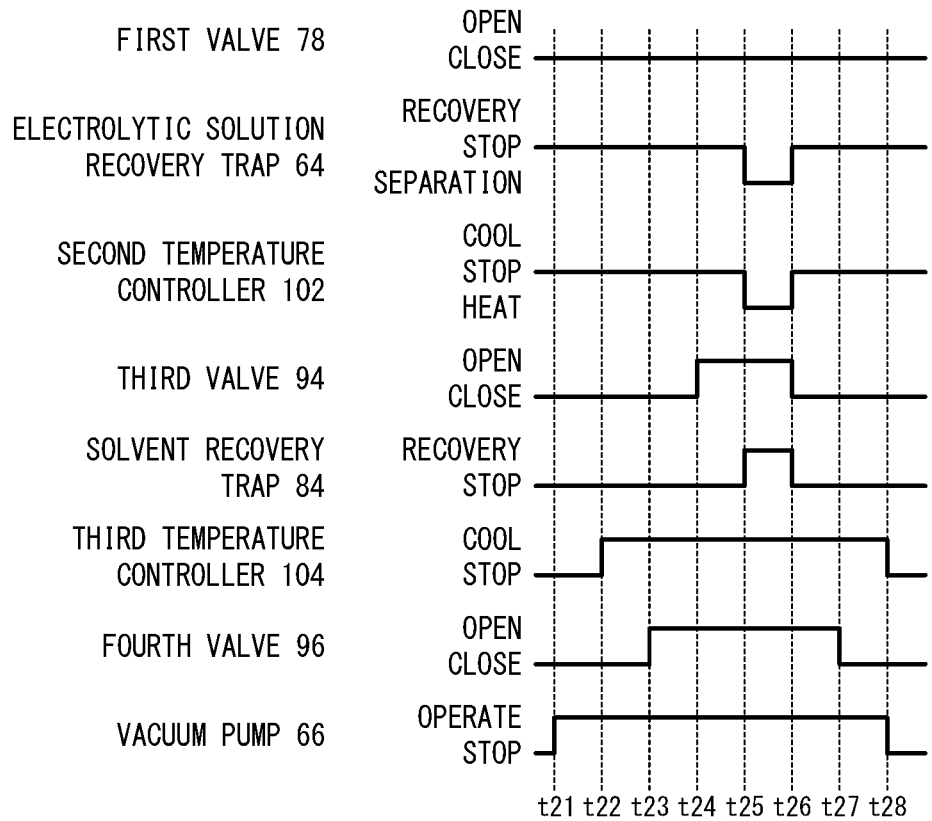
FIG. 7 is a time chart of a solvent separation and recovery process.

As shown in FIG. 7, the vacuum pump 66 is operated at time t21. Next, at time t22, the cooling function of the third temperature controller 104 is activated, and the temperature inside the solvent recovery trap 84 is adjusted to be less than or equal to a liquefying temperature of the solvent. Furthermore, at time t23, the fourth valve 96 is opened, and at time t24, the third valve 94 is opened. At this time, the interior of the electrolytic solution recovery trap 64 is placed in communication with the vacuum pump 66 through the sixth pipe 86, the third valve 94, the seventh pipe 88, the solvent recovery trap 84, the eighth pipe 90, the fourth valve 96, and the ninth pipe 92.

At time t25, while the low temperature state of the solvent recovery trap 84 is maintained, the second temperature controller 102 is operated, whereby the temperature inside the electrolytic solution recovery trap 64 is adjusted to be greater than or equal to the boiling point of the solvent. Upon doing so, the solvent contained within the mixed solution that is stored in the electrolytic solution recovery trap 64 is vaporized, and separation thereof from the electrolyte component is started. The vaporized and gaseous solvent is aspirated by the vacuum pump 66, and is sucked out from the electrolytic solution recovery trap 64. In addition, the solvent flows into the solvent recovery trap 84 via the sixth pipe 86, the third valve 94, and the seventh pipe 88. Since the solvent recovery trap 84 is cooled to be less than or equal to the liquefying temperature of the solvent, the gaseous solvent is condensed and liquefied in the interior of the solvent recovery trap 84. On the other hand, the electrolyte remains inside the electrolytic solution recovery trap 64. In this manner, the mixed solution in the interior of the electrolytic solution recovery trap 64 is separated by distillation into the solvent and the electrolyte, and the solvent is recovered in the solvent recovery trap 84.

When the solvent component in the interior of the electrolytic solution recovery trap 64 is sufficiently distilled, or the amount thereof becomes negligibly small at time t26, separation of the mixed solution and recovery of the solvent are stopped, and the third valve 94 is closed. Furthermore, substantially simultaneously with closing of the third valve 94, the second temperature controller 102 is stopped.

Upon completion of the solvent separation and recovery process, the fourth valve 96 is closed at time t27. Finally, at time t28, the third temperature controller 104 is stopped, and the vacuum pump 66 also is stopped.

In addition, by detaching the electrolytic solution recovery trap 64 and the solvent recovery trap 84 from the solvent separation and recovery system 54, the solvent and the electrolyte can be individually reused. For example, the solvent can be returned to the solvent tank 62.

4-3. Electrolyte Removal Process+Solvent Separation and Recovery Process

Figure 3:
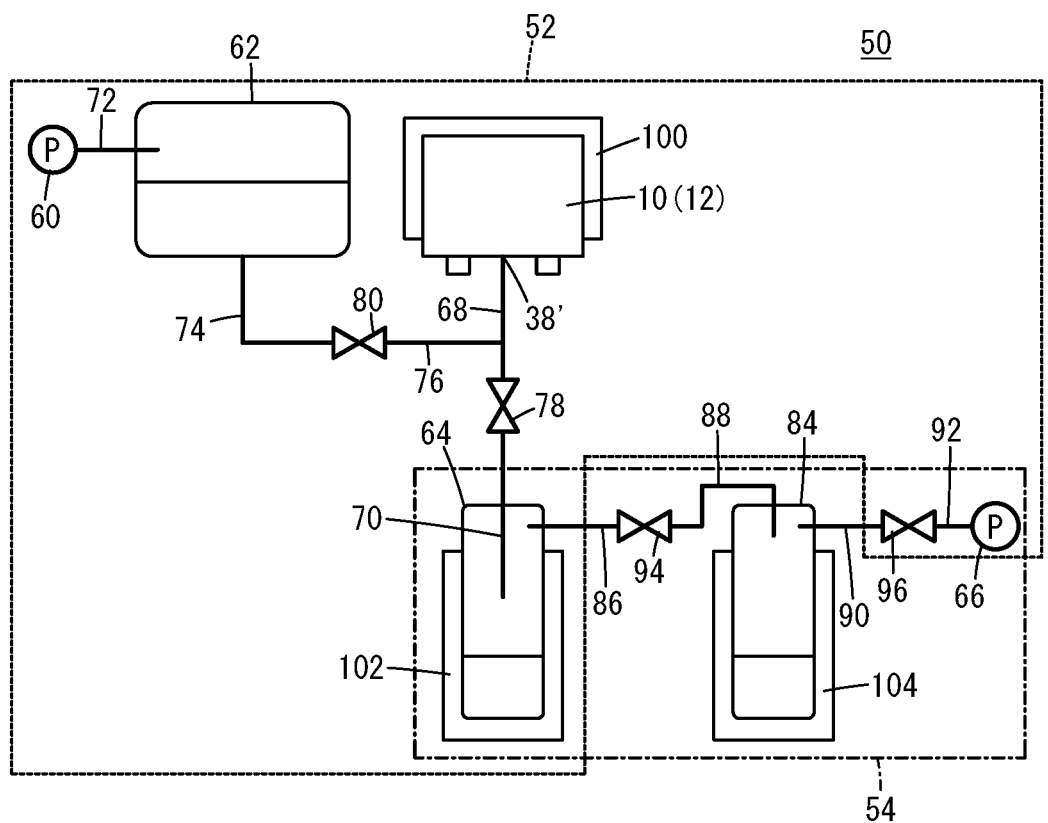
FIG. 3 is a system configuration diagram of a lithium ion battery treatment system.

In the lithium ion battery treatment system 50 shown in FIG. 3, the electrolyte removal process shown in FIG. 6 and the solvent separation and recovery process shown in FIG. 7 can be performed consecutively. In this case, the processes from time t25 and thereafter shown in FIG. 7 may be performed after time t11 shown in FIG. 6.

5. Summary of the Present Embodiment

In the present embodiment, the opening forming step is carried out (from time t1 to time t5) for forming the opening 38' in the battery casing 12. Next, the electrolytic solution aspirating step is carried out (from time t5 to time t6), by which the electrolytic solution is sucked out from the interior of the battery casing 12, via the opening 38', and into the sealed and decompressed electrolytic solution recovery trap 64. Next, the solvent injecting step is carried out (from time t8 to time t9), by which a solvent that does not contain the electrolyte is injected from the solvent tank 62, via the opening 38', and into the interior of the battery casing 12. In addition, the mixed solution aspirating step is carried out (from time t10 to time t11), by which a mixed solution, which contains the solvent injected into the battery casing 12 in the solvent injecting step and any of the electrolyte remaining inside the battery casing 12, from the interior of the battery casing 12, via the opening 38', and into the sealed and depressurized electrolytic solution recovery trap 64.

According to the present embodiment, using a simple method by which, after the electrolyte inside the battery casing 12 has been sucked out into the sealed and depressurized electrolytic solution recovery trap 64, the interior of the battery casing 12 is cleaned by carrying out both injection and sucking out of the solvent, in addition to removal of the electrolyte from the battery constituent members including the battery casing 12, it is possible to safely disassemble the lithium ion battery 10. Accordingly, without waste, it is possible to take out and recover the battery constituent members including the battery casing 12. Furthermore, the electrolyte can be easily recovered.

In the opening forming step of the present embodiment, the pressure relief valve 38 provided on the battery casing 12 is arranged to face vertically downward, and the opening 38' is formed in the pressure relief valve 38. Since the pressure relief valve 38 is thin-walled, it is easy to form the opening 38'. Further, by orienting the pressure relief valve 38 to face vertically downward, it is possible to efficiently aspirate the electrolytic solution as well as the mixed solution.

In the present embodiment, the first valve (first opening and closing valve) 78, which is adapted to switch between a communicating state and a communication interrupted state between the opening 38' and the electrolytic solution recovery trap 64, and the second valve (second opening and closing valve) 80, which is adapted to switch between a communicating state and a communication interrupted state between the opening 38' and the solvent tank 62, are used. In the electrolytic solution aspirating step, the first valve 78 is opened and the second valve 80 is closed, to thereby place the opening 38' and the sealed and depressurized electrolytic solution recovery trap 64 in a communicating state. In the solvent injecting step, the first valve 78 is closed, and thereafter, the second valve 80 is opened, to thereby place the opening 38' and the solvent tank 62 in a communicating state. In the mixed solution aspirating step, the first valve 78 is opened and the second valve 80 is closed, to thereby place the opening 38' and the sealed and depressurized electrolytic solution recovery trap 64 in a communicating state.

According to the present embodiment, the interior of the battery casing 12, which is in the reduced pressure state, and the solvent tank 62, which is in a higher pressure state than the battery casing 12, are placed in communication with each other by the second valve 80, and therefore, it is possible to easily inject the solvent from the solvent tank 62 into the battery casing 12. In addition, in the solvent injecting step, cleaning can be performed by causing the solvent to flow back into the cell portion in the battery casing 12, and a significant cleaning effect can be obtained. Further, after the solvent has been injected into the battery casing 12 in the solvent injecting step, the battery casing 12 and the sealed and depressurized electrolytic solution recovery trap 64 are placed in communication with each other again via the first valve 78. Therefore, the electrolyte that was recovered in the electrolytic solution aspirating step, and the mixed solution that was recovered in the mixed solution aspirating step can be recovered by the same route (first pipe 68, second pipe 70) via the first valve 78. Therefore, the configuration of the apparatus can be simplified.

In the present embodiment, following the mixed solution aspirating step, a plurality of sets of the solvent injecting step and the mixed solution aspirating step may be repeated. By performing the solvent injecting step and the mixed solution aspirating step respectively a plurality of times, a highly significant cleaning effect inside the battery casing 12 can be obtained. Accordingly, it becomes possible to more safely disassemble the lithium ion battery 10.

In the present embodiment, in the electrolytic solution aspirating step and the mixed solution aspirating step, the battery casing 12 is heated. A large aspirating effect can be obtained by raising the temperature inside the battery casing 12. Accordingly, it is possible for the electrolytic solution and the mixed solution to be sucked out efficiently.

6. Modified Embodiment

The first valve 78 and the second valve 80 shown in FIG. 3 may be constituted by a switching valve adapted to switch, in a timewise differentiated manner, the communicating state between the opening 38' and the electrolytic solution recovery trap 64, and the communicating state between the opening 38' and the solvent tank 62. As the switching valve, it is possible to use a three-way valve having three ports, namely, a port communicating with the battery casing 12, a port communicating with the solvent tank 62, and a port communicating with the electrolytic solution recovery trap 64. By using the switching valve, switching from the communicating state between the opening 38' and the electrolytic solution recovery trap 64 to the communicating state between the opening 38' and the solvent tank 62, and switching from the communicating state between the opening 38' and the solvent tank 62 to the communicating state between the opening 38' and the electrolytic solution recovery trap 64 can be carried out with a simple operation.

The mixed solution need not be discharged until a predetermined time period has elapsed since the interior of the battery casing 12 was filled with the solvent from time t8 to time t9 shown in FIG. 6. By doing so, dissolving of the electrolyte in the solvent can be promoted.

Instead of forming the opening 38' in the pressure relief valve 38 of the battery casing 12, an opening may be formed at another location. However, the easiest and most operatively efficient method is to utilize the pressure relief valve 38.

The invention claimed is:

1. A lithium ion battery electrolyte removal method for removing an electrolyte from an interior of a battery casing filled with an electrolytic solution, comprising:
    an adjustment step of depressurizing an electrolytic solution recovery trap by evacuating a gas in an interior of the electrolytic solution recovery trap, and adjusting a temperature inside the electrolytic solution recovery trap to be equal to or lower than a boiling point of a solvent retained in a solvent tank;
    an opening forming step of arranging a pressure relief valve provided on the battery casing to face vertically downward, and forming an opening in the pressure relief valve;
    an electrolytic solution aspirating step of sucking out the electrolytic solution from the interior of the battery casing, via the opening facing vertically downward, and into the sealed and depressurized electrolytic solution recovery trap;
    a solvent injecting step of injecting the solvent that does not contain an electrolyte from the solvent tank, via the opening, and into the interior of the battery casing that has been made into a depressurized state by the suction of the electrolytic solution in the electrolytic solution aspirating step; and
    a mixed solution aspirating step of sucking out a mixed solution, which contains the solvent injected into the battery casing in the solvent injecting step and any of the electrolyte remaining inside the battery casing, from the interior of the battery casing, via the opening, and into the sealed and depressurized electrolytic solution recovery trap,
    wherein following the mixed solution aspirating step, a plurality of sets of the solvent injecting step and the mixed solution aspirating step are repeated.

2. The lithium ion battery electrolyte removal method according to claim 1, wherein:
    a first opening and closing valve is provided, which is adapted to switch between a communicating state and a communication interrupted state between the opening and the electrolytic solution recovery trap, and a second opening and closing valve is provided, which is adapted to switch between a communicating state and a communication interrupted state between the opening and the solvent tank;

in the electrolytic solution aspirating step, the first opening and closing valve is opened and the second opening and closing valve is closed, to thereby place the opening and the sealed and depressurized electrolytic solution recovery trap in a communicating state;

in the solvent injecting step, the first opening and closing valve is closed, and thereafter, the second opening and closing valve is opened, to thereby place the opening and the solvent tank in a communicating state; and in the mixed solution aspirating step, the first opening and closing valve is opened and the second opening and closing valve is closed, to thereby place the opening and the sealed and depressurized electrolytic solution recovery trap in a communicating state.

3. The lithium ion battery electrolyte removal method according to claim 2, wherein the first opening and closing valve and the second opening and closing valve are constituted by a switching valve adapted to switch, in a timewise differentiated manner, the communicating state between the opening and the electrolytic solution recovery trap, and the communicating state between the opening and the solvent tank.

4. The lithium ion battery electrolyte removal method according to claim 1, wherein, in the electrolytic solution aspirating step and the mixed solution aspirating step, the battery casing is heated.

* * * * *